(12) United States Patent
Yamawaki

(10) Patent No.: US 8,077,387 B2
(45) Date of Patent: Dec. 13, 2011

(54) OPTICAL MICROSCOPE

(75) Inventor: Yasuhiro Yamawaki, Ina (JP)

(73) Assignee: Olympus Corporation, Tokyo (JP)

( * ) Notice: Subject to any disclaimer, the term of this patent is extended or adjusted under 35 U.S.C. 154(b) by 562 days.

(21) Appl. No.: 12/256,591

(22) Filed: Oct. 23, 2008

(65) Prior Publication Data

US 2009/0109525 A1 Apr. 30, 2009

(30) Foreign Application Priority Data

Oct. 30, 2007 (JP) ................ 2007-282060

(51) Int. Cl.
*G02B 21/06* (2006.01)
(52) U.S. Cl. .......... 359/385; 359/388; 359/390
(58) Field of Classification Search ........... 359/385, 359/388, 390
See application file for complete search history.

(56) References Cited

U.S. PATENT DOCUMENTS

2007/0024965 A1* 2/2007 Sander ............ 359/385
2008/0106787 A1* 5/2008 Tsutsui et al. ...... 359/385

FOREIGN PATENT DOCUMENTS

| JP | 7-168001 A | 7/1995 |
| JP | 2003-274930 A | 9/2003 |
| JP | 2006-115760 A | 5/2006 |

* cited by examiner

*Primary Examiner* — Joshua L Pritchett
(74) *Attorney, Agent, or Firm* — Holtz, Holtz, Goodman & Chick, PC

(57) ABSTRACT

An optical microscope, which has a light source, for observing a sample by illuminating light from the light source on the sample includes a second light source that is different from the light source and is insertable/removable in/from the optical path of the optical microscope. The second light source is configured to have the peak of an emission spectrum only in a wavelength range of 400 to 490 nm.

7 Claims, 5 Drawing Sheets

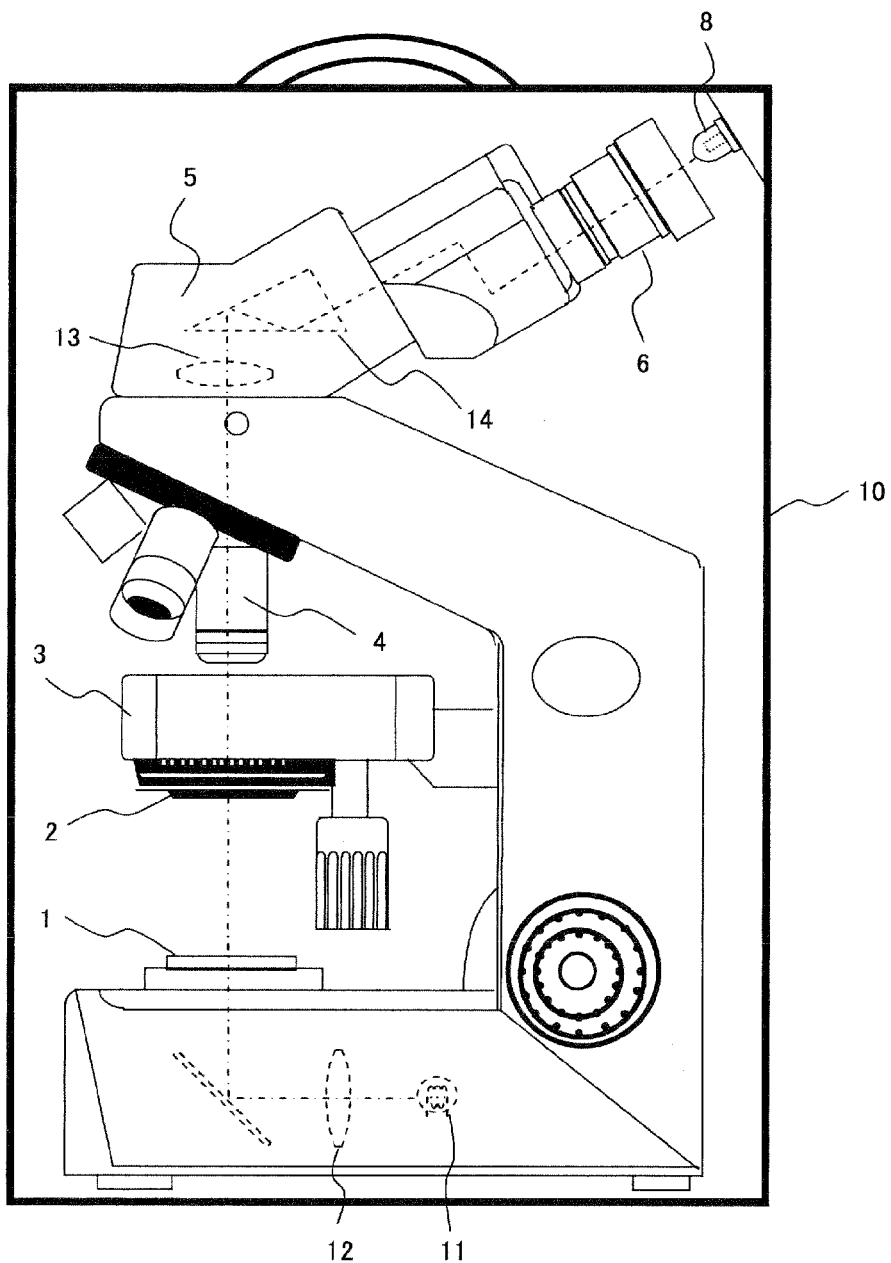
F I G. 4

OPTICAL MICROSCOPE

CROSS REFERENCE TO RELATED APPLICATIONS

This application claims benefit of Japanese Application No. 2007-282060, filed Oct. 30, 2007, the contents of which are incorporated by this reference.

BACKGROUND OF THE INVENTION

1. Field of the Invention

The present invention relates to a technique of an optical microscope, and more particularly, to a technique for preventing fungi from growing on an optical element provided in an optical microscope.

2. Description of the Related Art

Fungal growth on an optical element such as a lens, a prism, etc. is cited as one of factors to cloud an optics system of an optical microscope. Especially, fungal growth is a serious problem in the use of a microscope under a hot and humid environment.

Optical elements of an optical microscope are configured by combining many lenses, prisms, etc., and fungi can possibly grow on all of their surfaces. However, it is difficult in many cases to clean an optical surface depending on its type when fungi grow. Accordingly, it is vital to prevent fungi from growing (antifungal treatment) before they grow.

A technique for putting or coating an antifungal agent of a transpiration property on an inner wall of a microscope is conventionally known. With this technique, however, the antifungal agent fully transpirates, and loses its efficacy.

Additionally, Japanese Patent Application Publication No. H7-168001 discloses the technique for producing an antifungal efficacy by coating an optical element of a microscope with a photocatalyst. With this method, light having a wavelength on the order of 420 nm or shorter must be illuminated to activate a photocatalyst. However, general optical glass does not transmit ultraviolet rays. An optics system of a microscope, especially, an eyepiece lens of a microscope normally uses optical glass that does not transmit ultraviolet rays.

In the meantime, it is well known that illuminating ultraviolet rays significantly inhibits the growth of microorganisms such as fungi, etc. Japanese Patent Application Publication No. 2003-274930 discloses that even a light having a wavelength of 400 to 490 nm beyond ultraviolet rays also inhibits the growth of microorganisms, and encourages sporulation.

SUMMARY OF THE INVENTION

An optical microscope in a first aspect of the present invention is an optical microscope, which has a first light source, for observing a sample by illuminating light from the first light source on the sample, and includes a second light source that is different from the first light source and is insertable/removable in/from the optical path of the optical microscope, wherein the second light source has the peak of an emission spectrum only in a wavelength range of 400 to 490 nm.

BRIEF DESCRIPTION OF THE DRAWINGS

The present invention will be more apparent from the following detailed description when the accompanying drawings are referenced.

FIG. 4 is a schematic diagram showing an embodiment where the antifungal light source is placed in a storage box.

DESCRIPTION OF THE PREFERRED EMBODIMENTS

Embodiments according to the present invention are described below with reference to the drawings.

Figure 1:
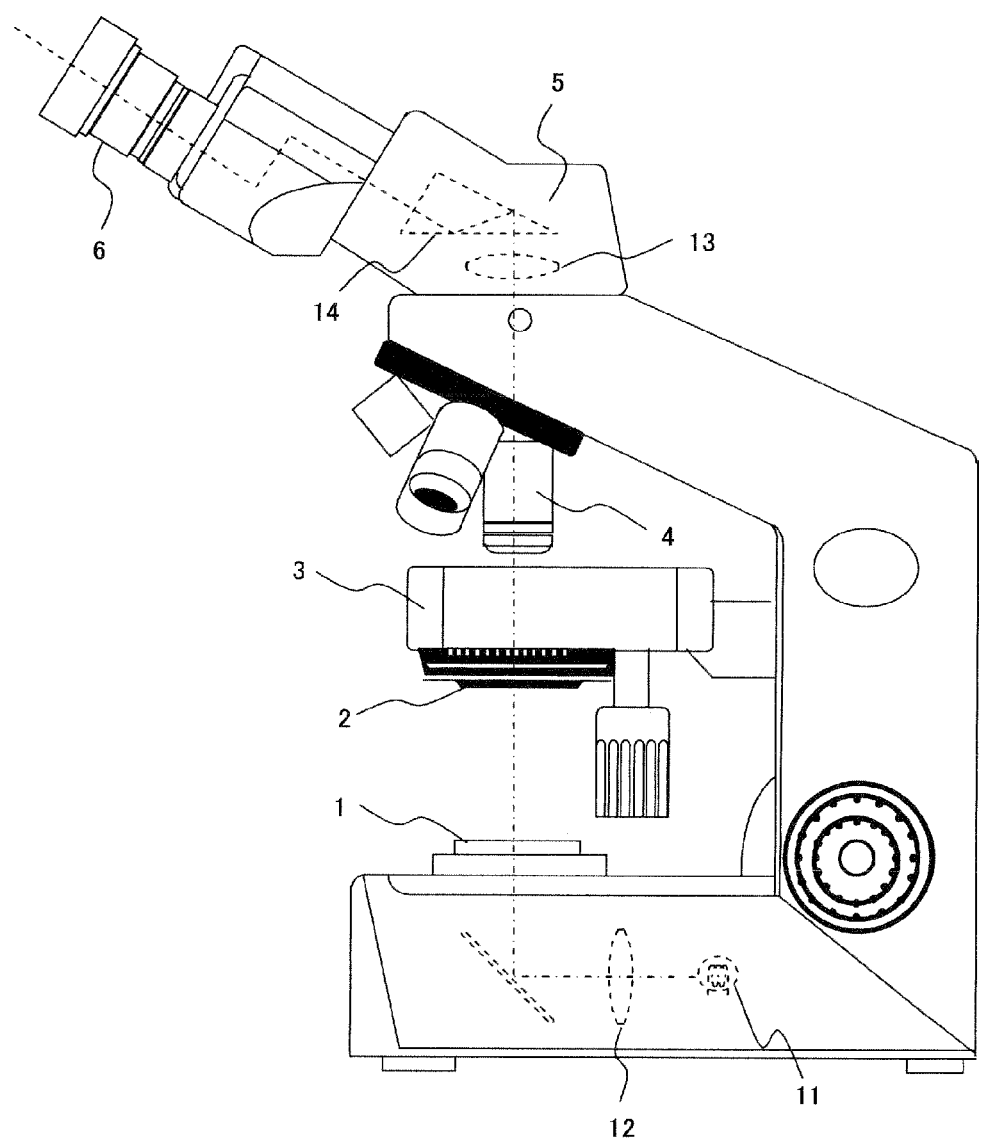
FIG. 1 is a schematic diagram showing a general optical microscope.

FIG. 1 is an external view of a general optical microscope suitable for embodiments according to the present invention. With this optical microscope, illumination light emitted from a light source 11 included in the body illuminates a sample on a stage 3 with a condenser lens 2 after transmitting through a collector lens 12 and a field lens 1. Observation light from the sample illuminated with the illumination light is magnified by an objective lens 4, and reaches an eyepiece lens 6 via a tube lens 13 and a prism 14 within a tube 5. In this way, the sample is observed.

Embodiments according to the present invention are described below by taking the optical microscope shown in FIG. 1 as an example.

First Embodiment

Figure 2:
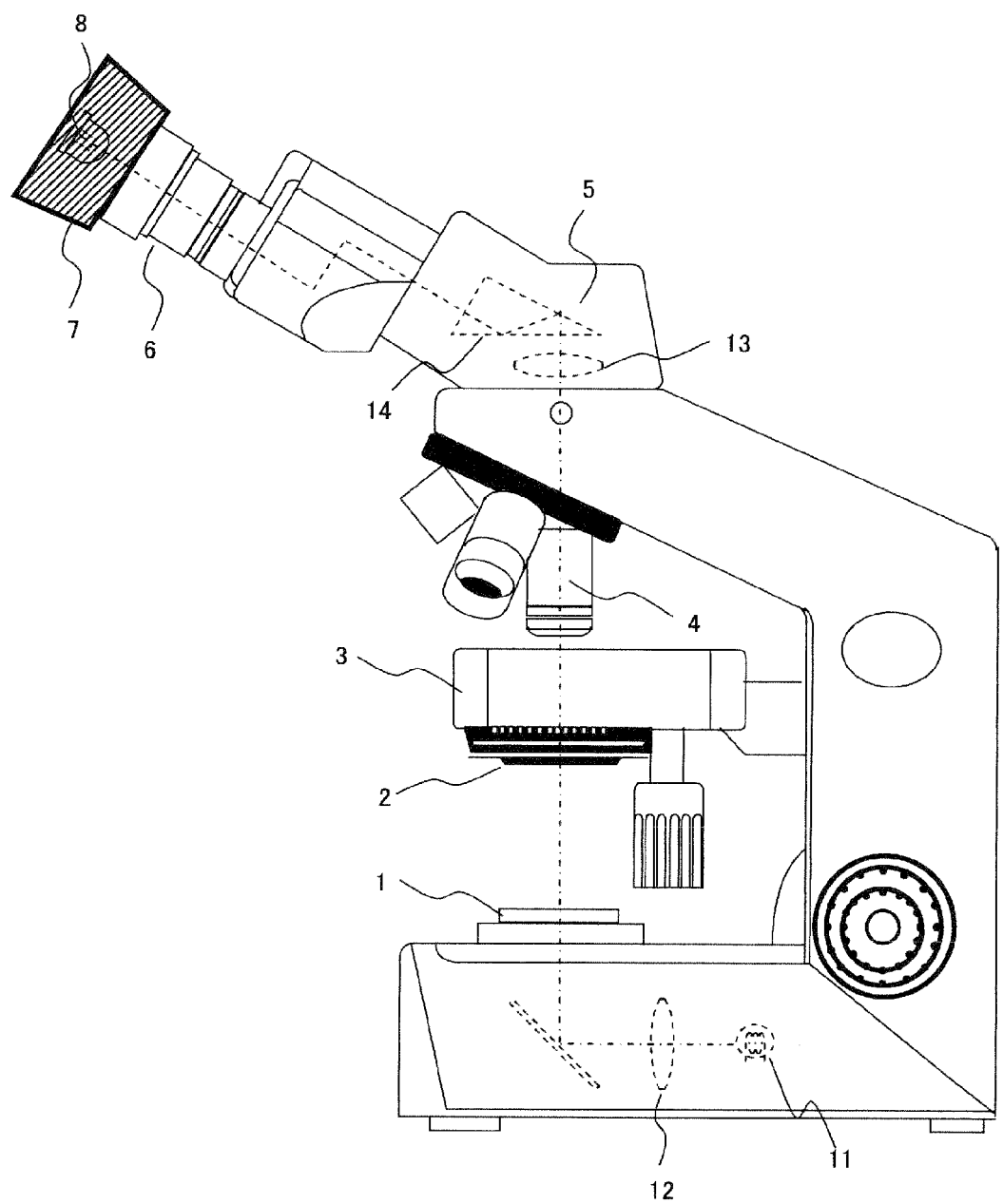
FIG. 2 is a schematic diagram showing an embodiment where an antifungal light source is included in an eyepiece lens cap.

FIG. 2 is a schematic diagram showing an optical microscope according to the first embodiment, which includes an antifungal light source within an eyepiece lens cap.

The optical microscope shown in FIG. 2 has an eyepiece lens cap 7 for the eyepiece lens 6 of the optical microscope shown in FIG. 1, and includes a blue LED 8 within the eyepiece lens cap 7. This position is optically called a pupil position. If a light source is arranged in the pupil position, a light beam emitted from this light source passes through space similar to the entire optical path by Kohler illumination. The diameter of a lens, etc. is normally designed so that a light beam emitted from this position does not cause vignetting. Accordingly, it is efficient to arrange the antifungal light source in that position. Moreover, the blue LED 8 is part of the eyepiece lens cap 7, and serves as the eyepiece lens cap 7 in this configuration. Therefore, attaching of fungal spore can be prevented.

Most of recent optical microscopes have a binocular eyepiece lens. In this case, two eyepiece lens caps 7 may be independently provided, or a unitized configuration for splitting a light beam from one blue LED 8 into two beams and for guiding to the eyepiece lens may be considered.

FIG. 2 illustrates the blue LED 8 as the antifungal light source. However, the antifungal light source is not particularly limited.

As described above, light having the wavelength of 400 to 490 nm suppresses the growth of microorganisms. Accordingly, fungi can be prevented from growing by illuminating light having the wavelength of 400 to 490 nm on an optical element. Namely, the antifungal light source included in the eyepiece lens cap is preferably a light source that emits light having the wavelength of 400 to 490 nm.

As the light source that has the peak of an emission spectrum only in the wavelength range of 400 to 490 nm, the blue LED (Light Emitting Diode) illustrated in FIG. 2 can be cited. If the blue LED is used as the antifungal light source, its power consumption is low, which is preferable.

Second Embodiment

Figure 3:
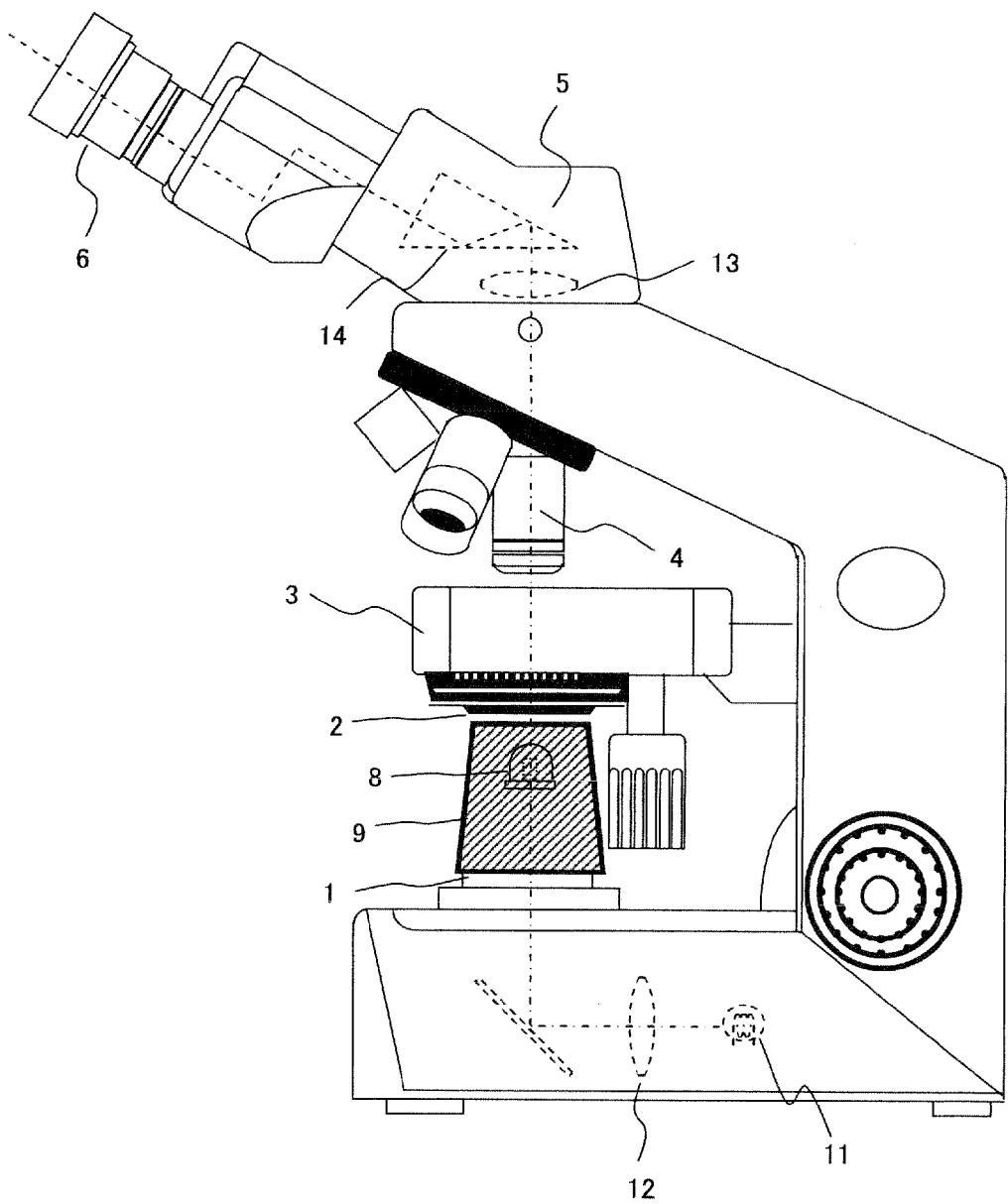
FIG. 3 is a schematic diagram showing an embodiment where the antifungal light source is placed in the front focal position of a condenser lens.

FIG. 3 is a schematic diagram showing an embodiment where the antifungal light source is placed in the front focal position of the condenser lens.

In the optical microscope shown in FIG. 3, a tube-shaped antifungal light source unit 9 is inserted between the field lens 1 and the condenser lens 2 of the optical microscope shown in FIG. 1 when observation is not made. The antifungal light source unit 9 includes the blue LED 8. Therefore, the blue LED 8 is placed in the neighborhood of the front focal position of the condenser lens 2 by inserting the antifungal light source unit 9 as described above. Since the back focal position of the eyepiece lens 6 and the front focal position of the condenser lens 2 are optically conjugate (referred to as a pupil position), also illumination light from this position causes little vignetting and reaches the entire optics system. Generally, the optical path between the field lens 1 and the condenser lens 2 is freely open. Therefore, it is preferable to insert/remove the antifungal light source unit 9 in this position. Additionally, since this position is in the neighborhood of the pupil position, it is also effective from an optical viewpoint to insert/remove the antifungal light source unit 9 in this position.

The reason why the antifungal light source unit 9 is made insertable/removable is that the antifungal light source hinders observation if it is placed on the optical path.

Depending on an illumination optics system, not the field lens 1 but the collector lens 12 is sometimes arranged in this position. Also in this case, the optical path between the collector lens 12 and the condenser lens 2 is open. Therefore, the antifungal light source unit 9 may be inserted in this portion. Moreover, there are optical microscopes that do not emit light by themselves as a light source but use a mirror for reflecting natural light. For such optical microscopes, the mirror is arranged in the position corresponding to the field lens 1. Therefore, the antifungal light source unit 9 may be inserted between the mirror and the condenser lens 2.

Third Embodiment

FIG. 4 is a schematic diagram showing an example of a configuration where the storage box 10 of the microscope includes the blue LED 8, which is placed in the neighborhood of the back focal position of the eyepiece lens 6 when the microscope is stored.

The tube 5 of the microscope shown in FIG. 4 can rotate freely, and the microscope can be therefore stored compactly. Such a rotational mechanism is also used not to hinder an observer from taking light when a mirror is used as the light source. Note that, however, this rotational mechanism is not essential to the present invention. The microscope may have any configuration as far as the blue LED 8 is placed in the neighborhood of the eyepiece lens 6 when the microscope is stored in the storage box 10.

The reason why this position of the blue LED 8 in the third embodiment is preferable is similar to that of the first embodiment.

Fourth Embodiment

Figure 5:
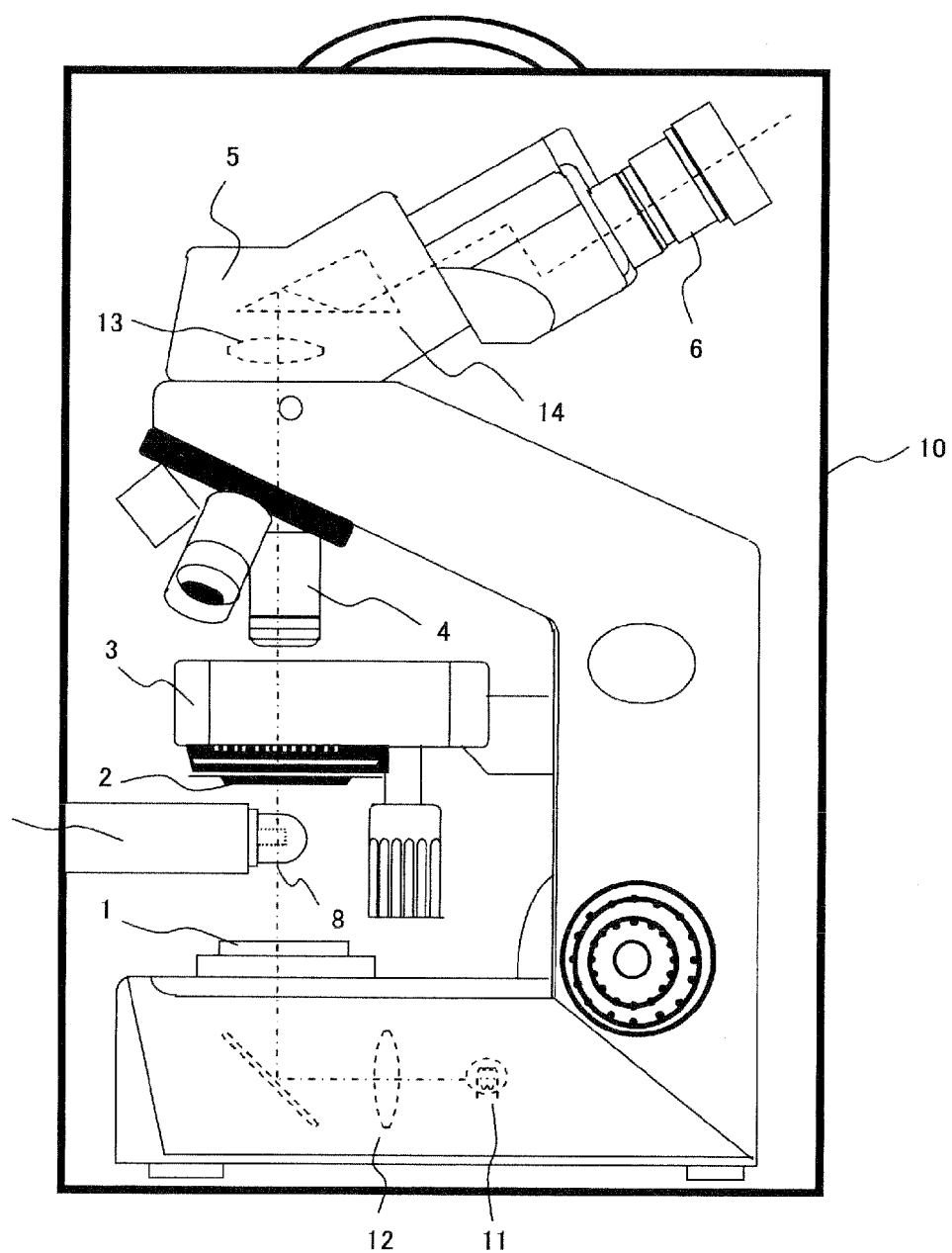
FIG. 5 is a schematic diagram showing another embodiment where the antifungal light source is placed in the storage box.

FIG. 5 is a schematic diagram showing an example of a configuration where the storage box 10 of the microscope has the blue LED 8, which is placed in the neighborhood of the front focal position of the condenser lens 2 when the microscope is stored.

In this configuration, the storage box 10 has a support 15 for holding the blue LED 8, which is placed in the neighborhood of the front focal position of the condenser lens 2 when the microscope is stored.

The reason why this position of the blue LED 8 in the fourth embodiment is preferable is similar to that of the second embodiment.

Some embodiments according to the present invention have been described up to this point. However, the present invention is not limited to these embodiments, and various modification examples can be considered. The effect of the present invention can be fully produced, for example, also with a configuration where the antifungal light source is placed to be insertable/removable between the objective lens 4 and the tube lens 13, or with a configuration where the antifungal light source is placed to be insertable/removable between the prism 14 and the tube lens 13 within the tube, or between the prism 14 and the eyepiece lens 6. Additionally, by providing the antifungal light source in the neighborhood of the rotational axis of the revolver of the objective lens 4, a configuration for simultaneously illuminating all of objective lenses can be implemented.

What is claimed is:

1. An optical microscope, which includes a first light source, for observing a sample by illuminating light from the first light source on the sample, the optical microscope comprising:
   a second light source that is different from the first light source and is insertable/removable in/from an optical path of the optical microscope, wherein:
   the second light source has a peak of an emission spectrum only in a wavelength range of 400 nm to 490 nm,
   the second light source is included in a storage box of the optical microscope, and
   the second light source is placed in the optical path by storing the microscope.

2. The optical microscope according to claim 1, wherein the second light source is placed in a neighborhood of a front focal position of a condenser lens.

3. The optical microscope according to claim 1, wherein the second light source is a blue light emitting diode.

4. An optical microscope which includes a first light source, for observing a sample by illuminating light from the first light source on the sample, the optical microscope comprising:
   a second light source that is different from the first light source and is insertable/removable in/from an optical path of the optical microscope, wherein:
   the second light source has a peak of an emission spectrum only in a wavelength range of 400 nm to 490 nm,
   the second light source is placed in a neighborhood of a back focal position of an eyepiece lens,
   the second light source is included in an eyepiece lens cap, and
   the second light source is placeable in the neighborhood of the back focal position by attaching the eyepiece lens cap to the eyepiece lens.

5. The optical microscope according to claim 4, wherein the second light source is a blue light emitting diode.

6. A storage box for storing an optical microscope, which includes a first light source, for observing a sample by illuminating light from the first light source on the sample, the storage box comprising:
a second light source that has a peak of an emission spectrum only in a wavelength range of 400 nm to 490 nm,
wherein the second light source is placed in an optical path of the optical microscope when the optical microscope is stored.

7. An eyepiece lens cap which is attachable to an optical microscope, and which includes a first light source, for observing a sample by illuminating light from the first light source on the sample, the eyepiece lens cap comprising:
a second light source that has a peak of an emission spectrum only in a wavelength range of 400 nm to 490 nm,
wherein the second light source is placed in a neighborhood of a back focal position when the eyepiece lens cap is attached to the optical microscope.

* * * * *